United States Patent
Moudgal et al.

(10) Patent No.: US 6,286,082 B1
(45) Date of Patent: Sep. 4, 2001

(54) APPARATUS AND METHOD TO PREVENT OVERWRITING OF MODIFIED CACHE ENTRIES PRIOR TO WRITE BACK

(75) Inventors: Anuradha N. Moudgal, Fremont, CA (US); Belliappa M. Kuttanna, Austin, TX (US)

(73) Assignee: Sun Mocrosystems, Inc., Palo Alto, CA (US)

( * ) Notice: Subject to any disclaimer, the term of this patent is extended or adjusted under 35 U.S.C. 154(b) by 0 days.

(21) Appl. No.: 09/294,939

(22) Filed: Apr. 19, 1999

(51) Int. Cl.[7] .............. G06F 13/16; G06F 12/08
(52) U.S. Cl. ............ 711/143; 711/144; 711/152; 710/39
(58) Field of Search ................. 711/143, 144, 711/145, 182; 710/39; 712/225

(56) References Cited

U.S. PATENT DOCUMENTS

| 5,404,482 | * | 4/1995 | Stamm et al. | 711/145 |
| 5,455,924 | * | 10/1995 | Shenoy et al. | 711/118 |
| 5,923,855 | * | 7/1999 | Yamazaki | 711/144 |
| 5,974,508 | * | 10/1999 | Maheshwari | 711/144 |

OTHER PUBLICATIONS

Sohi, G. "Instruction Issue Logic for High–Performance, Interruptible, Multiple Function Unit, Pipelined Computers." IEEE Transactions on Computers, vol. 39, No. 3, Mar. 1990.*

* cited by examiner

*Primary Examiner*—Do Hyun Yoo
*Assistant Examiner*—Yamir Encarnación
(74) *Attorney, Agent, or Firm*—Pennie & Edmonds LLP

(57) ABSTRACT

A hazard control circuit for a cache controller that prevents overwriting of modified cache data without write back. The cache controller controls a non-blocking, N-way set associative cache that uses a write-back cache-coherency protocol. The hazard control circuit prevents data loss by deferring assignment until after completion of a pending fill for that way. The hazard control circuit of the present invention includes a transit hazard buffer, a stall assertion circuit and a way assignment circuit.

11 Claims, 12 Drawing Sheets

| Time / Event | Way 0 Data / MOSI State |
|---|---|
| $T_0$ | $D_0$ / M |
| $T_1$: S+1 A Misses<br>Way 0 Assigned$_1$<br>Writeback Initiated | $D_0$ / M → I |
| ⋮ | ⋮ |
| $T_5$: S+5 A Misses<br>Way 0 Assigned<br>Writeback Deemed Unnecessary | $D_0$ / I |
| $T_6$: S+1 A Completes<br>Way 0 Filled W/$D_1$ | $D_0$ → $D_1$ / I → O |
| $T_7$: S+5 A Completes<br>Way 0 Filled W/$D_5$ | $D_1$ → $D_5$ / O |

FIG. 3

(Stall Assertion Block)

| Lock Bits | | | | Select Inputs | | | | Assigned Way | |
|---|---|---|---|---|---|---|---|---|---|
| [3] | [2] | [1] | [0] | $S_3$ | $S_2$ | $S_1$ | $S_0$ | [1] | [0] |
| X | X | X | 0 | 0 | 0 | 0 | 1 | 0 | 0 |
| 0 | 0 | 0 | 1 | 0 | 0 | 1 | 0 | 0 | 1 |
| 0 | 0 | 1 | 1 | 0 | 1 | 0 | 0 | 1 | 0 |
| 0 | 1 | 0 | 1 | 0 | 0 | 1 | 0 | 0 | 1 |
| 0 | 1 | 1 | 1 | 1 | 0 | 0 | 0 | 1 | 1 |
| 1 | 0 | 0 | 1 | 0 | 0 | 1 | 0 | 0 | 1 |
| 1 | 0 | 1 | 1 | 0 | 1 | 0 | 0 | 1 | 0 |
| 1 | 1 | 1 | 1 | 0 | 0 | 0 | 0 | – | – |

Table II

FIG. 9

Buffer Block A

| Time | Events | Counter [2:0] / LOCK [3:0] | Cache Index A MOSI/Data | | | |
|---|---|---|---|---|---|---|
| | | | Way 0 | Way 1 | Way 2 | Way 3 |
| $T_0$ | — | 100 / 0000 | M / X | M / X | M / X | M / X |
| $T_1$ | S+1A Misses Assigned Way 0 | 011 / 0001 | M→I / X | M / X | M / X | M / X |
| $T_2$ | S+2A Misses Assigned Way 1 | 010 / 0011 | I / X | M→I / X | M / X | M / X |
| $T_3$ | S+3A Misses Assigned Way 2 | 001 / 0111 | I / X | I / X | M→I / X | M / X |
| $T_4$ | S+4A Misses Assigned Way 3 Stall Begins | 000 / 1111 | I / X | I / X | I / X | M→I / X |
| $T_5$ | S+3A Completes Way 2 Filled W/$D_4$ Stall Ends | 001 / 1011 | I / X | I / X | I→M / X→$D_3$ | I / X |
| $T_6$ | S+5A Misses Way 2 Assigned Writeback of $D_3$ Initiated Stall Begins | 000 / 1111 | I / X | I / X | M→I / $D_3$ | I / X |

FIG. 10A

APPARATUS AND METHOD TO PREVENT OVERWRITING OF MODIFIED CACHE ENTRIES PRIOR TO WRITE BACK

FIELD OF THE INVENTION

The present invention relates to a cache controller for a non-blocking, set associative cache. In particular, the present invention relates to a hazard control circuit for a cache controller that avoids overwriting modified cache data prior to write back.

BACKGROUND OF THE INVENTION

FIG. 1 illustrates, in block diagram form, a typical prior art multi-processor system 30. System 30 includes a number of processors, 32a, 32b, 32c, coupled via a shared bus 35 to memory 36. Processors 32 execute program instructions out-of-order (OOO). Each processor 32 has its own non-blocking cache 34.

Each cache 34 is N-way set associative. In other words, each cache index defines a set of N cache entries, also referred to as N ways. Each cache index way includes data and a tag to identify the memory address with which the data is associated. Additionally, MOSI bits are associated with each item of data in a cache to maintain cache coherency by indicating the MOSI state of the data entry. According to the MOSI protocol, each cache data entry can be in one of four states: M, O, S, or I. The I state indicates invalid data. The owned state, O, indicates that the data associated with a cache index is valid, has been modified from the version in memory, is owned by a particular cache and that another cache may have a shared copy of the data. The processor with a requested line in the O state responds with data upon request from other processors. The shared state, S, indicates that the data associated with a cache index is valid, and one or more other processors share a copy of the data. The modified state, M, indicates valid data that has been modified since it was read into cache and that no other processor has a copy of the data.

MOSI states help determine whether a cache access request is a miss or a hit. A cache hit occurs when one of the ways of a cache index includes a tag matching that of the requested address and the MOSI state for that way is not I. A cache miss occurs when none of the tags of an index set matches that of the requested address or when the way with a matching tag contains invalid data. Within system 30, at the time a miss is detected a determination is made whether a write-back is required. This determination is based upon MOSI state. A write back is necessary when a request misses in the cache and the index way assigned for the cache fill contains modified data; i.e., is in the M or O state.

FIG. 2 illustrates how MOSI states transition in response to various types of misses. In system 30, at the time the need for a write back is recognized, the line is invalidated by changing the way's MOSI bits to the I state. The MOSI state of the way will again be changed from I to another state upon completion of the fill that precipitated the write back.

This policy of changing MOSI bits to I at the time of write back determination can lead to data loss when more than N outstanding store misses are permitted in a non-blocking, N-way set associative cache, as is the case in system 30. Table I of FIG. 3 illustrates how these two factors can lead to data loss by overwriting modified data without first writing it back. Table I illustrates how the MOSI bits and data of one index change in response to a series of store misses for that index. At time $\tau_0$, all four ways of index A store modified data. At time $\tau_1$ when the first store, St1 A, misses Way0 is assigned for the required fill. The MOSI state of Way0 indicates a write back is necessary. In anticipation of the yet-to-be-completed write back, the MOSI state of Way0 is changed from M to I. Similar events occur at $\tau_2$ for way 1, $\tau_3$ for Way2, and at $\tau_4$ for Way3. When the N+1th store misses occurs at $\tau_5$ way 0 is again assigned for the necessary fill. Because the fill associated with St1 A has not yet completed, the MOSI state of Way0 is still I, indicating that a write back of the data in Way0 is not necessary. Subsequently, at $\tau_6$ the fill associated with St1 A is completed, writing data item D1 into Way0 and changing its MOSI state to M. At $\tau_7$ the fill associated with St5 A is completed writing data item D5 over D1. Data item D1 has been overwritten without the write back, even though its MOSI state is M. This data loss occurred because the determination of whether a write back was made while a previous fill for the same way was still pending.

One possible solution to avoiding overwriting modified data without a write back is to stall selection of store requests when there are N outstanding store misses. This eliminates the possibility that two fills can be pending at the same time for a single way. To illustrate the effect of this stall policy, consider the situation immediately after start-up when the tag bits for each cache entry represent the I state. In this situation the first N store requests will result in N outstanding cache misses. System 30 will respond to the Nth cache access request by stalling, without regard to the cache index associated with each cache access request. If all N store requests are to the same index then the stall was necessary to prevent data loss. However, if just one of the N pending cache accesses is for a different cache index then the stall is unnecessary because there was no danger of data loss. As used herein, a stall is unnecessary in a non-blocking, N-way set associative cache when there are fewer than N outstanding misses for any one cache index. While the performance penalty per unnecessary stall is small, it is incurred so frequently that the overall cost of unnecessary stalls is undesirable.

Thus, a need exists for a cache controller for a non-blocking, N-way set associative cache using a write-invalidate cache-coherency protocol that avoids overwriting cache data in the M or O states without first performing a write back.

A need also exists for a cache controller that reduces unnecessary cache stalls while preventing data loss possible when write back decisions are made at the time of miss detection.

A need exists for a cache controller that accounts for the cache indices associated with outstanding cache misses when determining whether to stall selection of cache access requests so that only necessary stalls are initiated.

A further need exists for a cache controller that reduces the duration of necessary stalls.

SUMMARY OF THE INVENTION

The hazard control circuit of the present invention prevents overwriting of modified cache data without write back in a non-blocking, N-way set associative cache that uses a write-invalidate cache-coherency protocol. The hazard control circuit does so by deferring assignment of a way for a miss until after completion of a pending fill for that way. The hazard control circuit of the prevent invention also avoids unnecessarily stalling selection of cache access requests and minimizes the length of necessary stalls.

The hazard control circuit of the present invention includes a transit hazard buffer, a stall assertion circuit and a way assignment circuit. The transit hazard buffer tracks pending cache access requests via a number of index entries. Each index entry includes an index identifier, an index counter and a set of index lock bits. The index identifier identifies a cache index for which there is at least one pending cache access. The index counter indicates the number of pending cache accesses to the identified index. The value of the index counter is modified as store requests are selected and as they are completed. The index lock bits indicate for a cache index which of its ways are available for a fill. A way is locked upon its assignment for a fill and is unlocked upon fill completion. The stall assertion circuit uses the index counters to determine when to initiate and terminate selection of store requests. The stall assertion circuit initiates a stall only when there are N outstanding cache access requests for a single cache index. The stall assertion circuit ends the stall as soon as safely possible, upon completion of the earliest completed pending access request for the index that initiated the stall. The way assignment block uses the cache index lock bits to assign ways for cache fill requests. Only unlocked ways are assigned for fills, thus insuring that every write back determination for a way is deferred until after completion of a pending fill previously assigned to that way.

Other objects, features, and advantages of the present invention will be apparent from the accompanying drawings and detailed description that follows.

BRIEF DESCRIPTION OF THE DRAWINGS

The present invention is illustrated by way of example and not by way of limitation in the figures of the accompanying drawings. In the accompanying drawings similar references indicate similar elements.

FIG. 3 illustrates data and MOSI state changes in response to a series of store misses.

FIG. 9 illustrates the response of a way assignment block to various inputs.

FIG. 10A illustrates how the contents of the transit hazard buffer change in response to a series of stores to a single index

DETAILED DESCRIPTION

Figure 1:
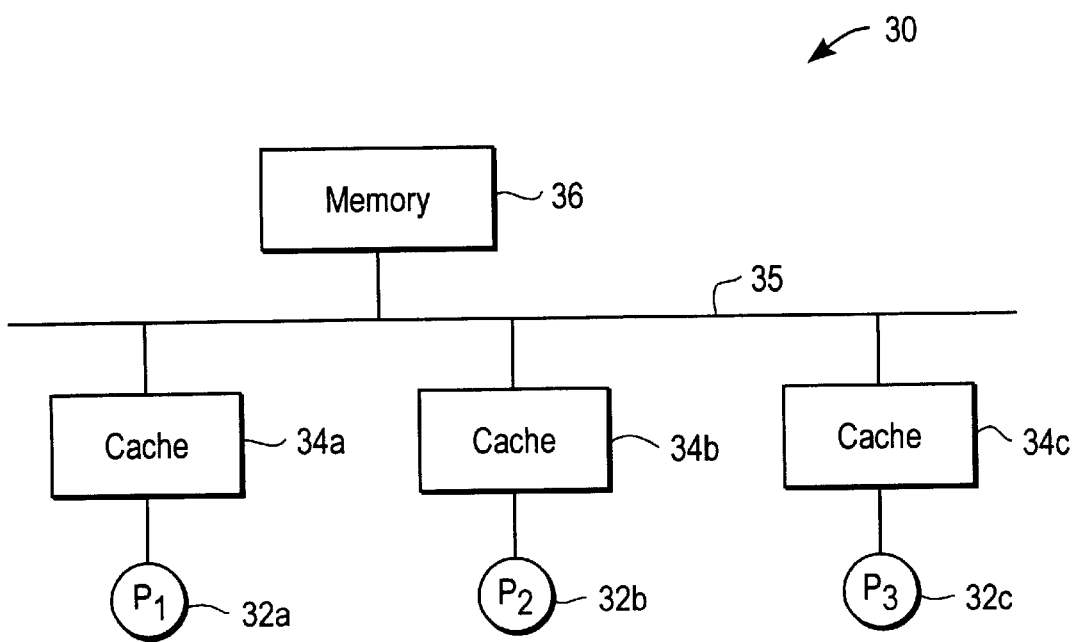
FIG. 1 illustrates a prior art multi processor system.
Figure 2:
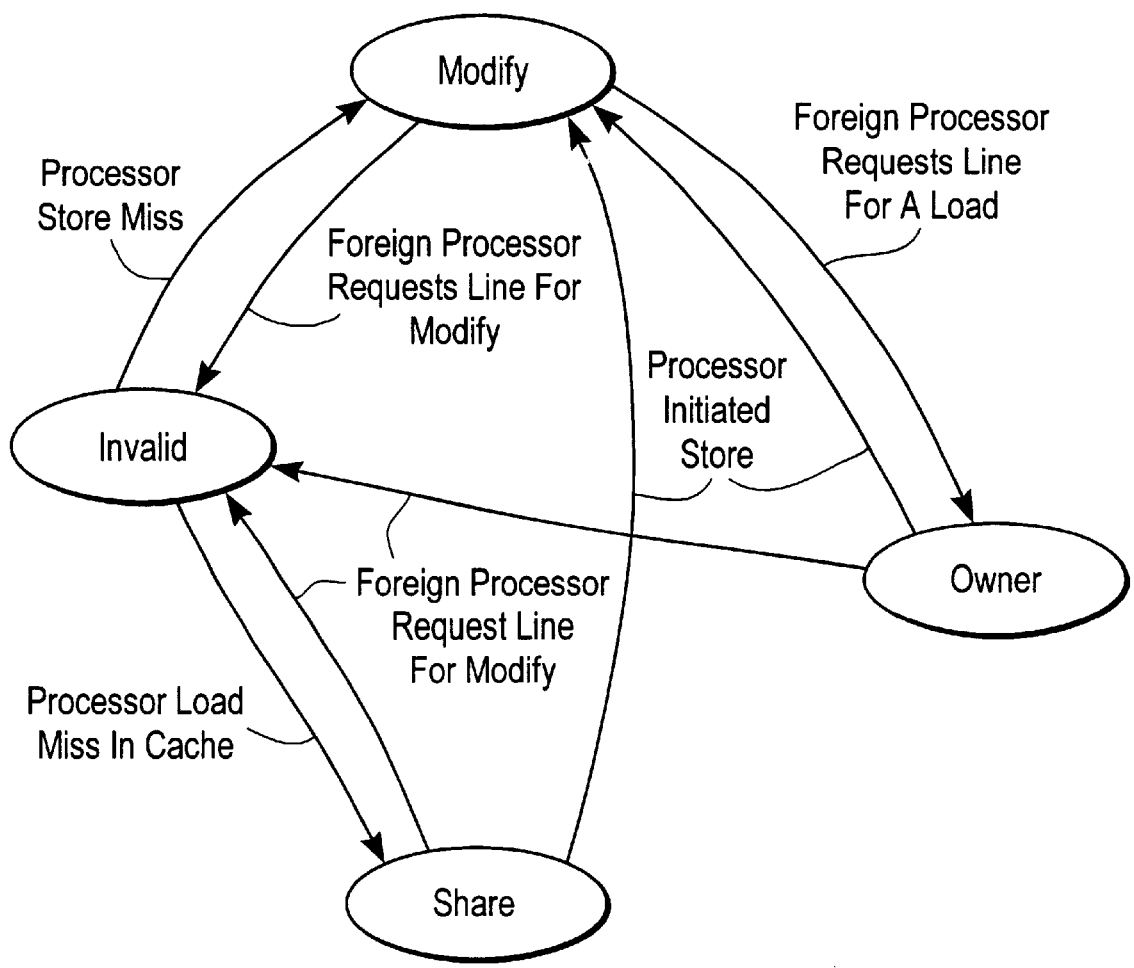
FIG. 2 illustrates states of the MOSI cache coherency protocol.
Figure 4:
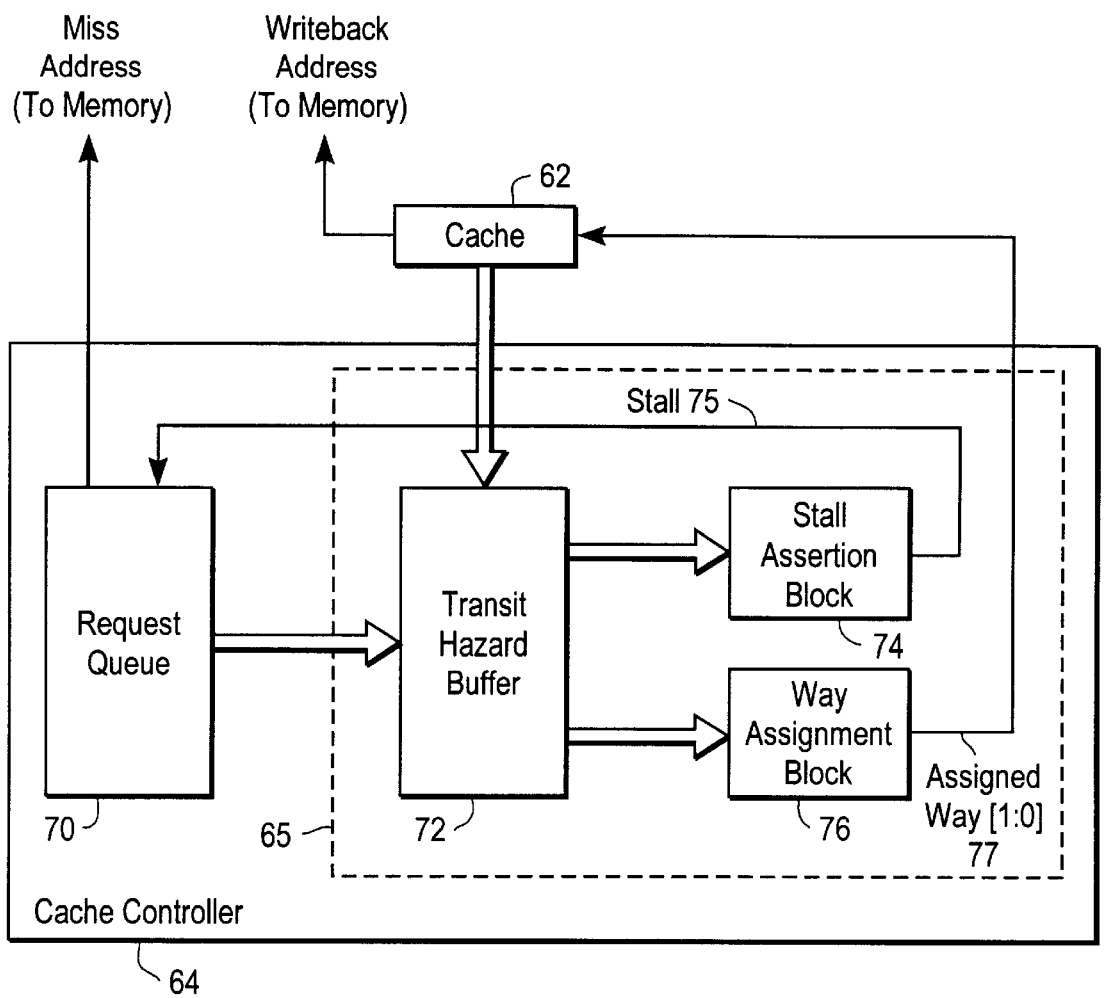
FIG. 4 illustrates a cache memory including the cache controller of the present invention.

FIG. 4 illustrates an N-way set associative, non-blocking Cache 62 using a write-invalidate cache-coherency protocol. Cache 62 is controlled by Cache Controller 64, which includes the Hazard Control Circuit 65 of the present invention. Hazard Control Circuit 65 prevents a cache fill to a way containing modified data from occurring prior to the completion of a write back of that modified data even though write back determinations are made at the time of miss detection.

Briefly described, Hazard Control Circuit 65 of the present invention includes Transit Hazard Buffer 72, Stall Assertion Block 74 and Way Assignment Block 76. Transit Hazard Buffer 72 stores a set of lock bits and a counter for each cache index for which there is at least one pending cache access request. Each index counter indicates the number of outstanding store access requests for a particular cache index and counter values are appropriately modified as store access requests begin and end processing. The set of index lock bits indicate the availability of each way of an index set for fill assignment. Ways are locked upon assignment of a way for a fill and are unlocked upon fill completion. Transit Hazard Buffer 72 is described in greater detail with respect to FIGS. 5 and 6. Stall Assertion Block 74 uses the index counters to determine when to stall selection of store requests from Request Queue 70, as well as when to end a stall. Stall Assertion Block 74 is described in greater detail with respect to FIG. 7. Way Assignment Block 76 uses the index lock bits to assign a way for a fill request to a particular index. Way Assignment Block 76 prevents overwriting of modified data from occurring without write back by assigning only unlocked ways for fills. This insures that write back detection for an assigned way is deferred until an immediately preceding fill to the same way is completed. Way Assignment Block 76 is described in greater detail with respect to FIG. 8. How Hazard Control Circuit 65 operates to avoid overwriting modified data without write back will be discussed in greater detail with respect to FIGS. 10A and 10B. How Hazard Control Circuit 65 operates to avoid unnecessary stalls will be discussed in greater detail with respect to FIG. 11.

A. Overview of the Hazard Control Circuit

Still referring to FIG. 4, Cache Controller 64 includes Request Queue 70 and Hazard Control Circuit 65. Request Queue 70 buffers incoming cache access requests until Cache Controller 64 selects the request for processing. (As used herein, "cache access request" includes both load and store requests.) Request Queue 70 indicates for each cache access request its type, the associated register and memory address. Cache Controller 64 selects cache access requests from request queue 70 only so long as the stall signal, Stall 75, is inactive.

In response to selection of a store request, Cache Controller 64 updates the information stored within Transit Hazard Buffer 72. This information is also updated whenever Cache 62 indicates completion of a pending store request. Information within Transit Hazard Buffer 72 is organized according to cache index. Transit Hazard Buffer 72 stores two types of information for each cache index for which there is a pending store request. First, via its index counters Transit Hazard Buffer 72 indicates the number of outstanding store requests for the cache index. Second, via its index lock Bits Transit Hazard Buffer 72 indicates the availability of each way of an index set for a fill. Transit Hazard Buffer 72 will be described in more detail with respect to FIGS. 5 and 6.

Stall Assertion Block 74 determines when a stall should be initiated, as well as when a stall should terminate. Both stall start and stall stop times are controlled via a Stall signal on line 75. Stall Assertion Block 74 asserts Stall 75 only when there are N store access requests pending for a single cache index. Consequently, the total number of store access requests that may be simultaneously pending is greatly increased. Any number of cache access requests may be outstanding so long as no single cache index has more than N store access requests pending. Additionally, Stall Assertion Block 74 minimizes the duration of necessary stalls.

Stall Assertion Block 74 deasserts Stall 75 as soon as one of the pending cache access requests for the cache index that triggered the stall is completed. Stall Assertion Block 74 uses the cache index counters of Transit Hazard Buffer 72 to determine the state of Stall 75. Stall Assertion Block 74 will be described in more detail with respect to FIG. 7.

Way Assignment Block 76 assigns a way of a cache index for a fill in response to a cache access request. Way Assignment Block 76 prevents a cache entry from being overwritten prior to completion of a necessary write back by assigning only unlocked ways for fills. Way Assignment Block 76 indicates the assigned way via Assigned Way[1:0] signal on line 77. (In this discussion, and in the figures, the bit fields of signals may be indicated in little-endian bit ordering, as Assigned Way[1:0] is.) Way Assignment Block 76 will be described in more detail with respect to FIGS. 8 and 9.

B. The Transit Hazard Buffer

Figure 5:
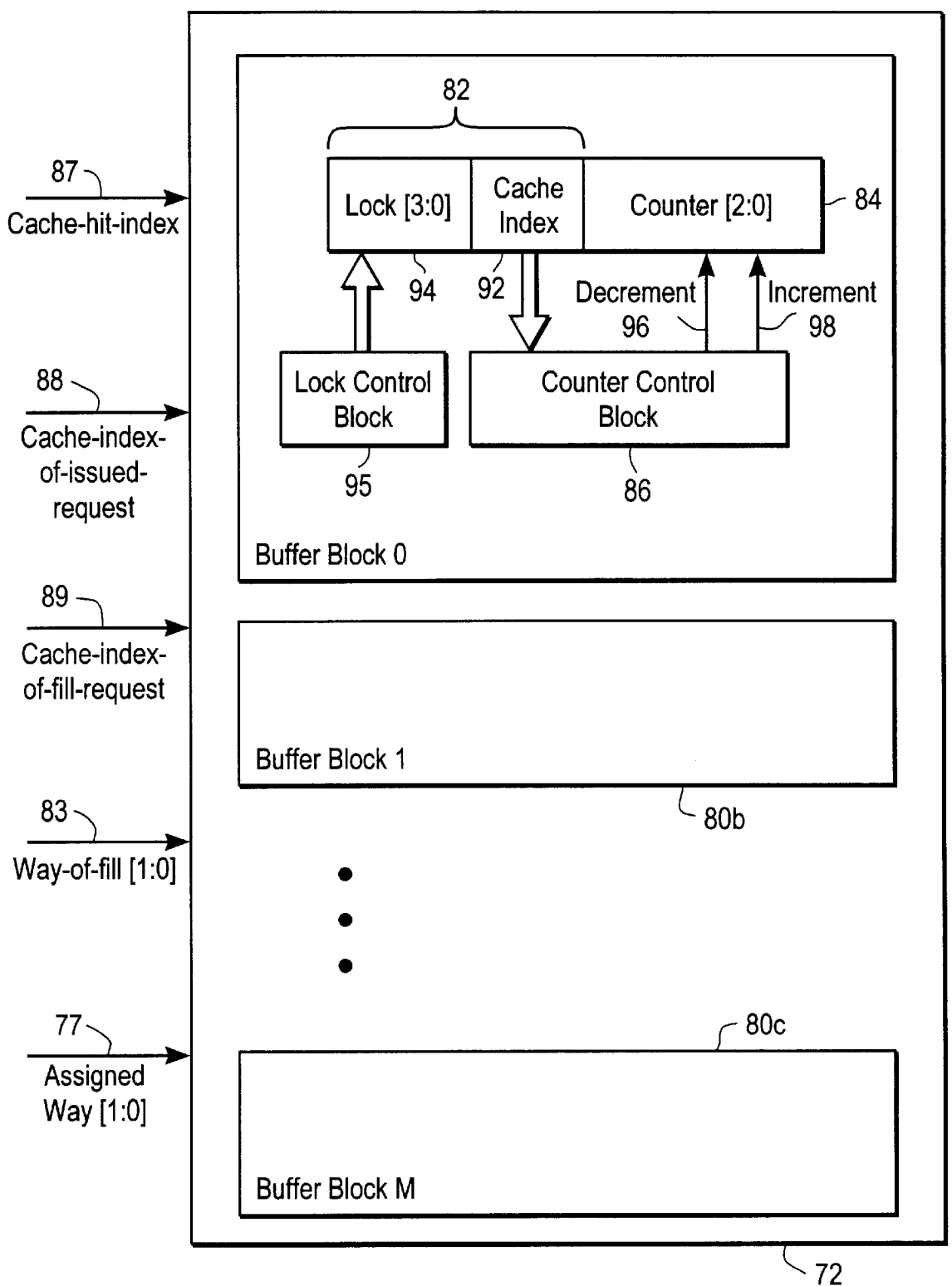
FIG. 5 illustrates the transit hazard buffer.

FIG. 5 illustrates, in block diagram form, an embodiment of Transit Hazard Buffer 72 for controlling a non-blocking, four-way set associative cache memory. (The Hazard Control Circuit of the present invention is compatible with any number, N, of ways). Transit Hazard Buffer 72 includes a multiplicity of Buffer Blocks 80a, 80b, and 80c. The exact number, M, of Buffer Blocks 80 included in Transit Hazard Buffer 72 is a design choice that may vary from at least N+1 to a maximum of one Buffer Block per cache index. All signals input to Transit Hazard Buffer 72 are coupled to all Buffer Blocks 80. Cache 62 provides three of the input signals: a Cache-Hit-Index signal on line 87, a Cache-Index-of-Fill-request signal on line 89 and Way-of-Fill[1:0] signal on line 83. The Cache-Hit-Index signal identifies a cache index at which a hit has just occurred. The Cache-Index-of-Fill-Request signal identifies a cache index for which a fill has just been completed and the Way-of-Fill signal identifies the associated way. The Assigned Way [1:0] signal on line 77 is input by Way Assignment Block 76 and identifies the way assigned for a fill request. Request Queue 70 generates the final signal input to Transit Hazard Buffer 72:the Cache-Index-of-Issued-Request signal on line 88, which identifies the cache index associated with the cache access request just selected from Request Queue 70 for processing. Transit Hazard Buffer 70 outputs two types of signals. First, each Buffer Block 80 outputs a LOCK[3:0] signal 94 to Way Assignment Block 76. Second, each Buffer Block 80 outputs a COUNTER[2:0] signal to Stall Assertion Block 74.

As illustrated with respect to Buffer Block 80a, each Buffer Block 80 includes Memory 82, Counter 84, Counter Control Block 86 and Lock Control Block 95. Memory 82 stores two pieces of information: a Cache Index 92 and LOCK[3:0] 94. Cache Index 92 identifies the cache index with which LOCK[3:0] 94 and Counter 84 are associated. LOCK[3:0] 94 includes one bit per way of the index's four-way set. Each lock bit indicates whether a way of the set is available for assignment.

Lock Control Block 95 controls the value of LOCK[3:0] 94. Lock Control Block 95 locks a way whenever that way is assigned for a write back, as indicated by Assigned Way[1:0] 77. Locking indicates that the way is no longer available for assignment. Lock Control Block 95 unlocks a way upon completion of a fill to that way, as indicated by Way-of-Fill [1:0] 83.

Counter 84 tracks the number of outstanding access requests for the associated cache index. Stall Assertion Block 74 uses the COUNTER[2:0] to determine when to start and when to end stalls. The value of COUNTER[2:0] is controlled by the signals Increment 96 and Decrement 98, generated by Counter Control Block 86.

Figure 6:
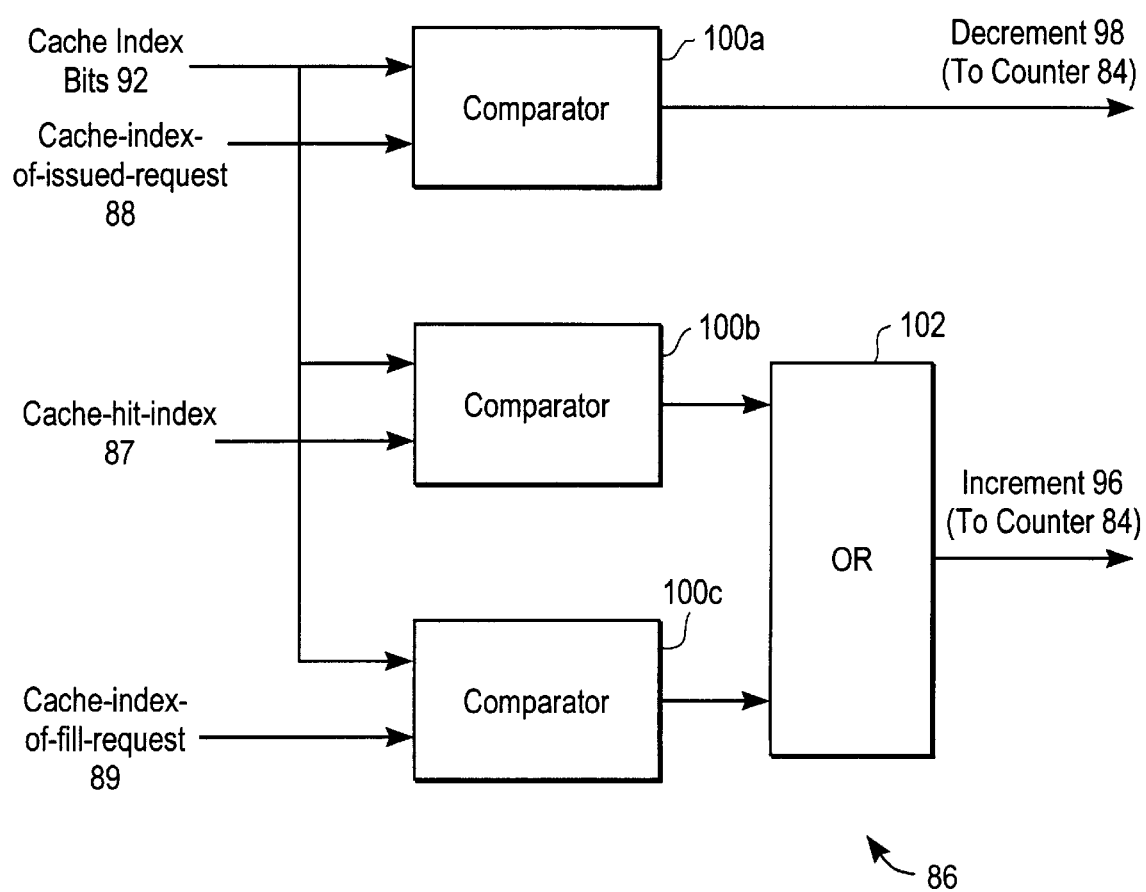
FIG. 6 illustrates a counter control block of the transit hazard buffer.
Figure 7:
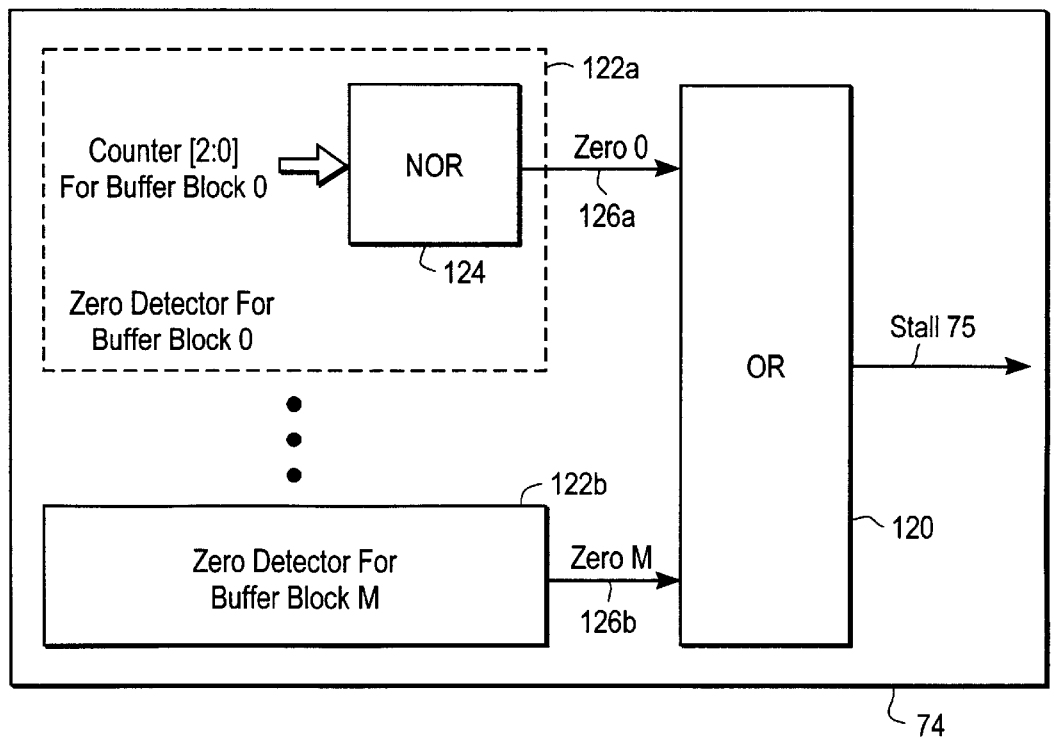
FIG. 7 illustrates the stall assertion block.

Counter Control Block 86 is illustrated, in block diagram form, in FIG. 6. This embodiment accommodates initiating a stall when the value of Counter 84 is zero; i.e. decrementing Counter 84 each time a cache access request is selected from Request Queue 70.

Counter Control Block 86 includes three comparators 100a, 100b, and 100c. Comparator 100a generates Decrement signal 98 by comparing cache index bits 92 to cache-index-of-issued-request signal 88. If the two cache indexes 92 and 88 match, yet another cache access request has been issued for this particular cache index. In response, comparator 100a asserts Decrement signal 98 to decrement the value of Counter 84. Because Counter 84 is decremented each time a cache access request is selected from Request Queue 70 Transit Hazard Buffer 72 tracks outstanding cache access requests, rather than outstanding cache misses. While not every cache access request results in a cache miss, tracking outstanding cache access requests enables Hazard Control Circuit 65 to anticipate and avoid situations that could lead to data loss.

Once selected, a cache access request can be completed by a cache-hit or a cache-miss-and-fill. Thus, both Cache-Hit-Index 87 and Cache-Index-of-Fill 89 are used to generate Increment 96. The logical OR circuit 102 asserts Increment whenever comparator 100b or 100c indicates a match. Comparator 100b indicates a match whenever Cache Index 92 represent the same cache index as Cache-Hit-Index 87. A match by comparator 100b indicates completion of one of the outstanding cache access requests for Cache Index 92. Comparator 100c indicates a match whenever cache index bits 92 represent the same cache index as Cache-Index-of-Fill 89. A match by comparator 100c also indicates completion of one of the outstanding cache access requests for Cache Index 92. Thus, Counter Control Block 86 increments Counter 84 as soon as an outstanding cache access request for the cache index is completed. This minimizes stall length because Stall Assertion Block 74 uses the index counter value to determine when to end a stall.

C. The Stall Assertion Block

The sole output of Stall Assertion Block 74, Stall signal on line 75, determines when stalls start and end. Stall Assertion Block 74 determines the state of the Stall signal using the cache index counter values of Transit Hazard Buffer 72. As illustrated in the block diagram of FIG. 7, Stall Assertion Block 74 includes a logical OR circuit 120 and one Zero Detector 122 for each of the M Buffer Blocks 80 of Transit Hazard Buffer 72.

As suggested by its name, a Zero Detector 122 detects when the value of a counter for a particular cache index is zero. A value of zero indicates that there are currently N outstanding cache access requests for the counter's associated cache index. As illustrated, each Zero Detector 122 is realized as a multi-input NOR gate 124. NOR gate 124 brings its output signal, Zero on line 126, active high only when COUNTER[2:0] equals $000_b$. This zero detector design is based upon the assumption that the counter value for a cache index is initially set to N, is decremented each time a cache access request for the associated cache index is selected, and is incremented upon completion of an outstanding cache access request for the associated cache index. Modification of Zero Detectors 122 to accommodate Counters 84 counting up from zero will be readily apparent.

The outputs from All Zero Detectors 122 are coupled to OR gate 120. The OR gate 120 initiates a stall by bringing the Stall signal on line 75 active whenever any Zero signal 126 indicates that there are N outstanding cache access requests pending for a single cache index. As a result of the stall, selection of cache access requests from Request Queue 70 halts. Thus, none of the Counters 84 can be decremented and no other Counter 84 can reach a value of zero before the cache index that initiated the stall ends it (However, cache access requests to other cache indexes that were pending at the time the stall was initiated continue to be processed). The OR circuit 120 ends a stall by bringing Stall 75 inactive as soon as any pending cache access request for the relevant cache index is completed.

D. The Way Assignment Block

Figure 8:
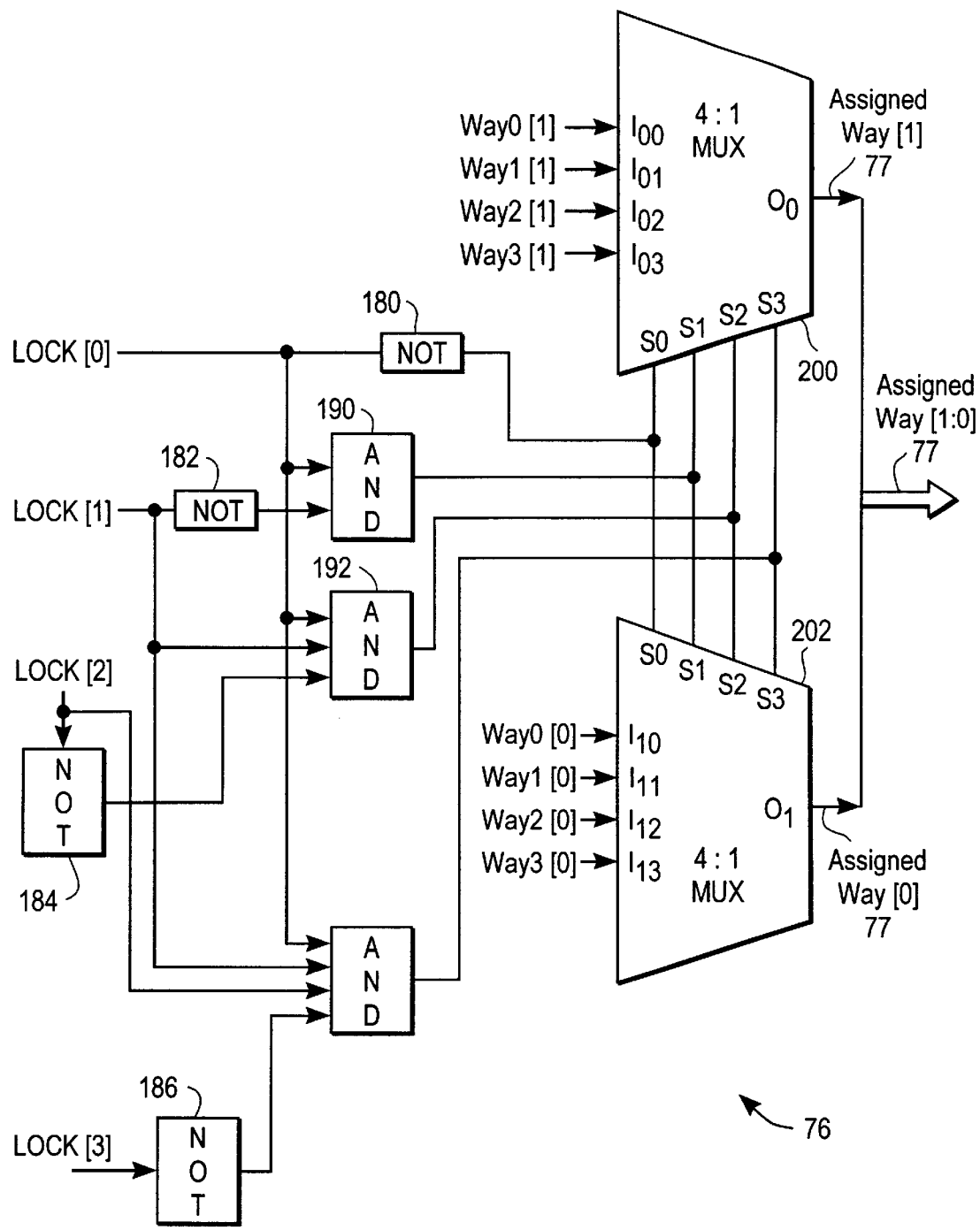
FIG. 8 illustrates a way assignment circuit of the way assignment block.

Way Assignment Block 76 is responsible for assigning a way for each cache fill, which it indicates via its output signal, Assigned Way[1:0] on bus 77. Way Assignment Block 76 prevents fills from occurring prior to completion of pending write backs, thereby preventing the data loss possible when there are back-to-back fills to a way whose data has been modified. Way Assignment Block 76 prevents data loss by only assigning unlocked ways of a cache index for fills, as indicated for each index by LOCK[3:0]. The outputs of Way Assignment Block 76 are fed back to the Lock Control Blocks 95 so that assigned ways can be locked. Way Assignment Block 76 includes one Way Assignment Circuit 78 per Buffer Block 80 of Transit Hazard Buffer 70. FIG. 8 illustrates one such Way Assignment Circuit 78, which includes NOT gates 180, 182, 184 and 186, AND gates 190, 192, and 194 two 4:1 tri-state multiplexers 200 and 202. The outputs of multiplexer 200 and 202 are combined to generate Assigned Way[1:0] 77.The inputs to multiplexers 20 and 202 are a set of way signals, Way0[1:0], Way1[1:0], Way2[1:0] and Way3[1:0]. The bits of each way signal represent a particular way; i.e., the bits of Way0[1:0] represent in binary the number 0. The voltage levels applied to select inputs $S_0, S_1, S_2$ and $S_3$ are determined using LOCK[3:0] 94. The voltage level applied to $S_0$ is determined solely by LOCK[0], which is inverted by NOT 180 prior to application to multiplexer chip 200. The voltage level applied to $S_1$ is determined by AND 190, which combines LOCK[0] and the inverse of LOCK[1]. The voltage level applied to $S_2$ is determined by AND 192, which combines LOCK[0], LOCK[1] and the inverse of LOCK[2]. The voltage level applied to $S_3$ is determined by AND 194, which combines LOCK[0], LOCK[1], LOCK[2] and the inverse of LOCK[3]. The combination of NOTs 180, 182, 184 and 186 and ANDs 190, 192 and 194 ensures that only one select input is active at a time.

Figure 11:
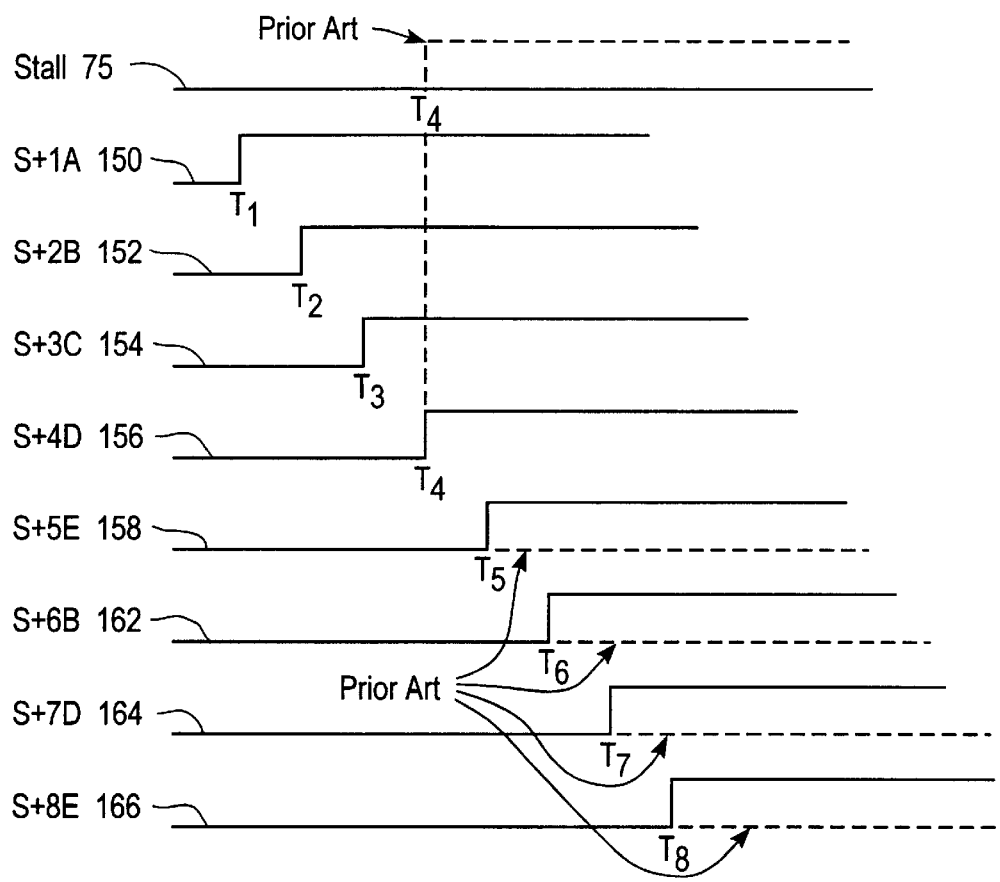
FIG. 11 illustrates how the stall assertion block avoids unnecessary stalls.

Table II of FIG. 11 indicates the values of $S_0, S_1, S_2$ and $S_3$, as well as for Assigned Way[1:0] for given values of LOCK[3:0]. Table II indicates locked ways with a "1" and the unlocked ways with "0". Examination of Table II reveals that a locked way is never assigned.

E. Operation of the Hazard Control Circuit

E1. Preventing the Overwriting Modified Cache Data without Write Back

Figure 10B:
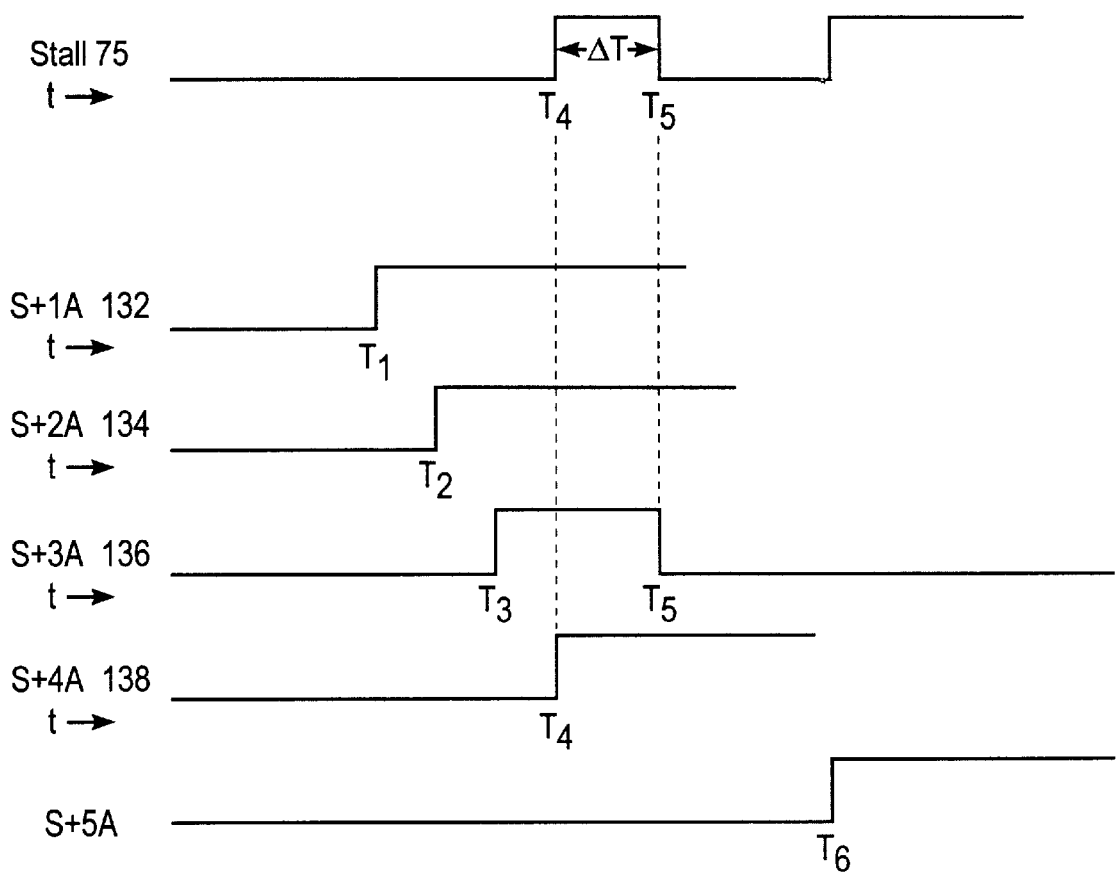
FIG. 10B illustrates the response of the stall assertion block to a series of stores to a single index.

How Hazard Control Circuit 65 avoids overwriting modified data without performing a write back in a 4-way set associative cache is illustrated by FIGS. 10A and 10B. These Figures show the response of Hazard Control Circuit 65 to the same circumstances that led System 30 to overwrite data without a write back; i.e., a series of N+1 stores to a single cache index. The store requests are individually designated as "St1 A, St2 A, ..." etc. Further, the buffer block circuitry associated with cache index A is identified by using the cache index as a suffix to reference numerals. Thus, for example, the Counter associated with cache index A will be designated as "84A". FIG. 10A indicates the values of COUNTER[2:0], LOCK[3:0], and the MOSI and data values for each way of index A. FIG. 10B graphs the processing of the various store requests and the state of Stall 75. In the graph of Stall 75, the high level indicates that a stall is active and a low level that there is no stall. In contrast, the high level of the graphs St1A, St2 A, etc., indicates that processing of the request is occurring and the low level indicates that processing of the request is not occurring.

Initially, at time $\tau_0$ the value of Counter 84A is $100_b$, all four ways of the index A set are unlocked and all four ways of cache index A store modified data. At time $\tau_1$ Cache Controller 64 selects from Request Queue 70 St1 A 132 and its processing begins. In response, Counter Control Block 86A decrements Counter 84A bringing its value to $011_b$. St1 A misses, initiating miss handling. Way Assignment Block 76 assigns Way0 of index A for the fill. Consequently, LOCKA[3:0] changes to $0001_b$ to indicate that Way0 is locked. The M state of the assigned way, Way0, indicates that a write back is necessary. The write back process begins by changing the MOSI state of Way0 from M to I. With its selection at time $\tau_2$ processing of St2 A 134 begins. Consequently, Counter 84A is decremented to $010_b$. St2 misses and the fill is assigned to Way1. Lock Control Block 95 responds to this assignment by bringing LOCKA[3:0] to $0011_b$, locking Way1. The M state of the assigned way, Way1, indicates that a write back is necessary. The write back process begins by changing the MOSI state of Way1 from M to I.

Processing of St3 A 136 begins at time $\tau_3$ decrementing Counter 84A, bringing it to $001_b$. St3 A misses and the fill is assigned to Way2. Lock Control Block 95 responds by bringing LOCKA[3:0] to $0111_b$, locking Way2. The M state of the assigned way, Way2, indicates that a write back is necessary. The write back process begins by changing the MOSI state of Way2 from M to I.

Processing of St4 A 138 begins at time $\tau_4$. Counter 84A is decremented to $000_b$, causing Stall Assertion Block 74 to assert Stall 75 at approximately $\tau_4$. St4 A misses and the fill is assigned to Way3. Lock Control Block 95 responds by locking Way3, bringing LOCKA[3:0] to $1111_b$. The M state of the assigned way, Way3, indicates that a write back is necessary. The write back process begins by changing the MOSI state of Way3 from M to I.

During the stall, Cache 60 continues processing the outstanding access requests until at time $\tau_5$ the first of the outstanding requests completes, St3 A 136. This overwrites the data associated with St3, D3, over the data currently stored in Way2 of cache index A, which has already been written back to memory. The fill of Way2 changes its MOSI state to M. Completion of St3 A 136 causes Counter Control Block 86A to increment Counter 84A bringing its value to $001_b$. FIG. 10B indicates completion of St3 A 136 via a change from high to low. Completion of St3 A unlocks Way2, bringing LOCKA[3:0] to $1011_b$. In response to the change in the value of COUNTER[2:0], Stall Assertion Block 74 deasserts Stall 75 at about $\tau_5$. (The response of Stall Assertion Block 74 would be identical regardless of which access request associated with cache index A completed first.) In contrast to the prior art, Stall Assertion Block 74 can safely end the stall at $\tau_5$, rather than waiting until after completion of all the outstanding cache access requests that were pending at the time of stall initiation. The present invention is able to safely minimize stall duration because LOCK[3:0] 94 indicates which way of index A can be filled without any danger of data loss.

After deassertion of the stall, Cache Controller 64 selects another cache access request, St5 A, at time $\tau_6$. Selection of St5 A brings COUNTER[2:0] to $000_b$ and initiates another stall. This store also misses and the fill is assigned to the only unlocked way, Way2. The M state of Way2 indicates the need for a write back of $D_3$ to memory and prevents the overwriting of $D_3$ without a write back. Write back of $D_3$ begins by changing the MOSI state of Way2 to I.

E2. Operation to Avoid Unnecessary Stalls

FIG. 11 illustrates how Stall Assertion Block 74 avoids unnecessary stalls by graphing the state of Stall 75 with time in response to a sequence of store requests to a number of different cache indexes. FIG. 11 also indicates the counter values for each cache index with respect to time. FIG. 11 and the following discussion use the same conventions set forth previously with respect to FIGS. 10A and 10B.

Initially, at time $\tau_0$, the value of each index Counter 84 is $100_b$ and all four ways of each cache index set are unlocked. At time $\tau_1$ Cache Controller 64 selects from request queue 70 St1 A 150, beginning its processing. In response, Counter Control Block 86A decrements counter 84A bringing its value to $011_b$. Additionally, one of the ways associated with cache index A is locked. Processing of St1 B 152 begins at $\tau_2$, causing Counter Control Block 86B to decrement Counter 84B. As a result the value of Counter 84B becomes $011_b$. In further response to the initiation of processing of St2 B 152 one of the ways of index B is locked. Processing of St3 C 154 begins at $\tau_3$, bringing the value of Counter 84C to $011_b$ and locking one of the ways of index C. Processing of St4 D 156 begins at $\tau_4$, bringing the value of Counter 84D to $011_b$ and locking one of the ways of index D. At this point there are four outstanding cache access requests, which would cause a prior art 4-way set associative cache controller to stall selection of further cache access requests. This prior art state is indicated in FIG. 9 by the dashed line graph of Stall 75. In contrast, the Stall 75 of the present invention remains inactive, indicated by the solid line remaining at a low level after $\tau_4$. Stall Assertion Block 74 does not assert Stall 75 at $\tau_4$ because none of the counters, 84A, 84B, 84C, 84D, or 84E, represents a value of zero. Consequently, Cache Controller 64 continues selecting cache access requests. At $\tau_5$ processing of St5 E 158 begins, bringing the value of Counter 84E to $011_b$ and locking one of the ways of index E. There are now five outstanding cache access requests and Stall 75 remains inactive, in contrast to the prior art. At $\tau_6$ processing of St6 B 162 begins, bringing the value of counter 84B to $001_b$ and locking a second way of index B. Six cache access requests are now pending and Stall 75 remains inactive, in contrast to the prior art. None of the index counters indicates a value of zero so Cache Controller 64 is able to continue selecting cache access requests from request queue 70 even though the number of pending cache access requests exceeds the number of ways of cache 62.

F. Conclusion

Thus, a hazard control circuit for a cache controller of a non-blocking, N-way set associative cache using a write-back invalidate protocol has been described that prevents data loss from occurring due to overwriting modified cache data without a write back. The hazard control circuit includes a buffer, a stall assertion circuit and a way assignment circuit. The buffer tracks pending store access requests via a number of index entries. Each index entry includes an index identifier, an index counter and a set of index lock bits. The index identifier identifies a cache index for which there is at least one the pending store access. The index counter indicates the number of pending store accesses to the identified index. The value of the index counter is modified as store access requests are selected and as they are completed. The lock bits indicate for each way of a cache index whether that way is available for assignment for a fill request. A way is locked whenever it is assigned for a store fill and is unlocked upon fill completion. The stall assertion circuit uses the index counters to determine when to initiate and when to terminate selection of store access requests. The stall assertion circuit initiates a stall only when there are N outstanding store access requests for a single cache index. The stall assertion circuit ends the stall upon completion of the earliest completed pending store access request for the index that initiated the stall. The way assignment block uses the cache index lock bits to assign ways for cache fill requests. Because only unlocked ways are assigned for store fills data loss is avoided.

In the foregoing specification, the invention has been described with reference to specific exemplary embodiments thereof. It will, however, be evident that various modifications and changes may be made hereto without departing from the broader spirit and scope of the invention as set forth in the appended claims. Accordingly, the specification and drawings are to be regarded in an illustrative rather than a restrictive sense.

What is claimed is:

1. Hazard control circuitry for a cache controller using a write-back invalidate protocol, the cache controller controlling a non-blocking, N-way set associative cache having a multiplicity of indexes, the hazard control circuitry comprising:

a buffer operative with the cache controller for tracking pending cache accesses, the buffer having an entry for each pending cache access, each entry including an index identifier, an index counter, and a set of index lock bits, the index identifier identifying an index of the cache to be accessed by the pending cache access, the index counter indicating a number of pending cache accesses to the identified index, the index counter being decremented for each pending cache access to the identified index, the index counter being incremented for each completed cache access to the identified index, the set of index lock bits indicating for the identified index whether each way is locked; and a stall assertion circuit coupled to the buffer for asserting a stall signal coupled to the cache controller, the stall assertion circuit asserting the stall signal whenever a first index counter for a first index indicates that there are N cache accesses pending for the first index, assertion of the stall signal causing the cache controller to stall selection of cache access requests.

2. The hazard control circuitry of claim 1 wherein the stall assertion circuit deasserts the stall signal whenever the index counter indicates that there are no longer N cache accesses pending for the first index.

3. The hazard control circuitry of claim 2 further comprising:

an assignment circuit coupled to the buffer and the cache controller, the assignment circuit assigning an unlocked way of the first index for a cache access to the first index.

4. A method of preventing overwriting of modified data stored in a way of a first cache index of a non-blocking, N-way set associative cache without a write back, the cache having a plurality of cache indexes comprising the first cache index and a plurality of lock bits comprising a first set of lock bits associated with the first cache index, the cache being associated with a processor of a multi-processor system, the method comprising:

a) receiving a first cache access request for the first cache index;

b) in response to receiving the first cache access request, updating a first index counter associated with the first cache index;

c) initiating a stall of the cache controller if the first index counter indicates that N cache access requests are pending for the first cache index, causing the cache controller to stall selection of cache access requests;

d) updating the first index counter for each completed cache access to the first cache index; and e) setting the first set of lock bits to indicate whether each way of the first cache index is locked.

5. The method of claim 4, further including:

ending the stall when the first index counter indicates that less than N cache access requests are pending for the first cache index.

6. A method of preventing overwriting of modified data stored in a way of a first cache index of a non-blocking, N-way set associative cache without a write back, the cache having a multiplicity of indexes, the cache being associated with a processor of a multi-processor system using a write-invalidate protocol using a modified state and an invalid state, the method comprising the steps of:

a) receiving notice of a first cache access request for the first cache index;

b) in response to receiving the notice, updating a first index counter associated with the first cache index;

c) initiating a stall of the cache controller if the first index counter indicates that N cache access requests are pending for the first cache index;

d) assigning a first way of the first cache index when the first cache access request misses using a first set of lock bits associated with the first cache index, the first set of lock bits including a bit for each way of the N-way set associative cache, each bit of the first set of lock bits indicating whether an associated way is available; and e) locking a first bit of the first set of lock bits.

7. The method of claim 6 further comprising the step of:

f) ending the stall in response to completion of a first completed cache access request of the pending cache access requests for the first cache index, the first completed cache access request having previously been assigned to a second way of the first cache index.

8. The method of claim 7 further comprising the step of:

g) unlocking a second bit of the first set of lock bits to indicate that the second way is available.

9. Hazard control circuitry for a cache controller using a write-invalidate cache-coherency protocol, the cache controller controlling a non-blocking, N-way set associative cache having a multiplicity of indexes, the hazard control circuitry comprising:

a) a buffer operative with the cache controller for tracking pending cache accesses, the buffer having an entry for each pending cache access, each entry including an index identifier, an index counter, and a set of index lock bits, the index identifier identifying an index of the cache to be accessed by the pending cache access, the index counter indicating a number of pending cache accesses to the identified index, the index counter being decremented for each pending cache access to the identified index, the index counter being incremented for each completed cache access to the identified index, the set of index lock bits indicating for the identified index whether each way is available for a fill;

b) a stall assertion circuit coupled to the buffer for asserting a stall signal coupled to the cache controller, the stall assertion circuit asserting the stall signal whenever a first index counter for a first index indicates that there are N cache accesses pending for the first index, assertion of the stall signal causing the cache controller to stall selection of cache access requests, the stall assertion circuit deasserting the stall signal when the index counter indicates that there are no longer N cache accesses pending for the first index; and c) an assignment circuit for assigning a way of the first index for a cache access request, the assignment circuit being coupled to the set of index lock bits, the assignment circuit assigning an unlocked way of the first index for a cache access request to the first index.

10. The hazard control circuitry of claim 9 wherein the buffer further comprises:

a1) a lock control block for determining states of the set of index lock bits, the lock control block locking a way whenever it is assigned for a fill and unlocking the way when the fill is completed.

11. Hazard control circuitry for a cache controller using a write-back invalidate protocol, the cache controller controlling a non-blocking, N-way set associative cache having a multiplicity of indexes, the hazard control circuitry comprising:

a buffer operative with the cache controller for tracking pending cache accesses, the buffer having an entry for each pending cache access, each entry including an index identifier, an index counter, and a set of index lock bits, the index identifier identifying an index of the cache to be accessed by the pending cache access, the index counter indicating a number of pending cache accesses to the identified index, the index counter being updated in a first manner for each pending cache access to the identified index, the index counter being updated in a second manner for each completed cache access to the identified index, the set of index lock bits indicating for the identified index whether each way is locked; and a stall assertion circuit coupled to the buffer for asserting a stall signal coupled to the cache controller, the stall assertion circuit asserting the stall signal whenever a first index counter for a first index indicates that there are N cache accesses pending for the first index, assertion of the stall signal causing the cache controller to stall selection of cache access requests.

* * * * *